UNITED STATES PATENT OFFICE.

FELIX RICHTER, OF FRANKFORT-ON-THE-MAIN, GERMANY.

PROCESS FOR THE PURIFICATION OF LIQUID HYDROCARBONS.

1,098,764.  Specification of Letters Patent.  Patented June 2, 1914.

No Drawing.  Application filed September 9, 1912. Serial No. 719,437.

*To all whom it may concern:*

Be it known that I, FELIX RICHTER, a citizen of the German Empire, residing at Frankfort-on-the-Main, Germany, have invented certain new and useful Improvements in Processes for the Purification of Liquid Hydrocarbons, of which the following is a specification.

I have proved by numerous experiments that while liquids of slightly alkaline character improve the action of catalyzers, liquids containing acid unfavorably affect the catalytic action of such materials as boneblack, blood carbon, charcoal or the particularly active carbon produced by the distillation of coal with mineral matter containing lime and clay. The deleterious action of acid liquids is probably due to the prompt absorption of the acid into the pores of the catalytic material, the acid either destroying or dissolving the exceedingly delicately developed active carbon surface or destroying or dissolving the mineral portions which support the active carbon surfaces.

Nearly all liquid hydrocarbons, more particularly crude rock-oil hydrocarbons, those of the benzol series and terpenes, the thorough purification of which is of great importance to industry, contain already organic and mineral acids, or such acids are formed by the action of the air. Hitherto, in order to remove such acid contents and thus to bring the catalyzers to the full efficiency, I have utilized, in accordance with my invention forming the subject matter of my prior application Serial Number 593955, active carbon containing lime. The highly divided lime contained in the said carbon, is converted by the calcining process required for rendering the carbon active, into caustic lime which exercises alkaline action in the liquid, and has some effect in neutralizing the acid or acids which may be present in the oil. But I have found by continued experiments that considerably better results of purification can be obtained by applying, before the catalytic treatment, a treatment with slight quantities of alkaline lye, by means of which the acids, partly with coöperation of the air or oxygen supplied, are converted into salts which are absorbed by the active surface without its structure being damaged, or are brought on the said surface into a thorough contact with the activated oxygen.

The present invention, therefore, consists in the combination of a process for purifying liquid hydrocarbons by mixing same with finely-divided catalyzers in solid condition and bringing the mixture into thorough contact with oxygen containing gases with a preliminary treatment of the hydrocarbons to be purified with alkaline lye. In such combined process finely-divided active carbon of any known kind may be used as catalyzing substance such as boneblack, blood carbon or above all, an active carbon obtained by distilling a finely-divided mixture of natural fuels such as the carbon powder formed by the handling of coal in briqueting factories and clay containing mineral matter such as fine ashes. Such finely divided carbon is intermixed with the hydrocarbon to be purified and oxygen-containing gas such as atmospheric air is introduced into the mixture preferably in finely-divided condition.

In order to avoid the damaging of the finely-divided active carbon by the purifying action in accordance with this invention the carbon is added to the hydrocarbon only after a preliminary treatment with alkaline lye.

The invention is carried out, for instance in a process for purifying illuminating oil, in the following manner: 100 liters of crude lighting petroleum are thoroughly mixed for 40 minutes, at ordinary temperature, with three liters of a 20% NaOH lye, by mechanical stirring or shaking or by blowing air through the liquid or by both means. The stirring gear and the admission of air, or the mixing blower, are then stopped, and the oil left to stand, the impurities contained in the lye, settling on the bottom fairly soon, whence they are removed in the usual manner. In many cases the subsequent washing and filtering of the thus preliminarily purified oil is advisable, but not absolutely necessary.

A somewhat modified process which in most cases renders the washing and filtering unnecessary, and exercises a very favorable influence on the quality of the oils, consists in mixing the oil, after the lye treatment above described is completed, with finely divided ashes, or clay, (more particularly clay calcined with exclusion of air,) or with similar inorganic or organic substances in the shape of fine powder of high absorptive properties and light weight, in the quantity of 300 to 400 gr. per 100 liters of oil, the mixing continuing then for another 2–3 minutes, after which the oil is left to settle, or is filtered. After this preliminary treatment, the oil separated from the precipitate or filtrate, is mixed with about 5 kg. of active carbon per 100 liters, as described in the prior application, the mixing continuing 30–40 minutes and being effected by introducing air in a fine spray through perforated pipes or in any other suitable manner, whereby the injurious impurities contained in the lighting oil, are completely separated, and a product excellent in every respect and having the greatest illuminating power, is obtained.

Purification of crude benzin and benzol is carried out in the same way, only considerably smaller quantity of lye, for instance for 100 liters only 0.5 liter of a 20% NaOH lye, being needed because of the naturally smaller quantities of impurities contained in the said light hydrocarbons, and in most cases about 2.5–3 kg. of active carbon are sufficient for carrying out the process. When treating these volatile substances, the injection of the air in fine sprays into the liquid must be effected in such a manner as to enable such vapors as escape to be eventually recovered and condensed.

The purification of pine oil can be for instance carried out in the following manner: 10 liters of pine oil are stirred for about 15 minutes with 50 cubic cms. 5% NaOH, the oil being added drop by drop, and then further mixed while continually stirred for 20–30 minutes, with about 100 gr. of finely ground clay (preferably calcined with exclusion of air), and the mixture is then filtered. The filtrate is treated, in the manner repeatedly described, with 50 gr. of active carbon per liter, and finished by longer settling or filtration.

The four comparative experiments given below, show in a striking manner the favorable effect of the combined use of alkali and active carbon, there resulting a considerable improvement in the color of the oil, in the smell of the oil and of the combustion gases, in smaller resinification and consequent carbonization of the wick, in the chimney remaining bright and, chiefly, in the considerable increase of the illuminating effect due to these properties.

*Experiment A.*—10 liters of Roumanian crude oil were thoroughly mixed for fifteen minutes with 450 cubic cms. of 66° $H_2SO_4$. The acid tar was then separated from the oil; the oil was neutralized with NaOH lye and washed with water. The color of the purified oil was greenish yellow; its smell like petroleum. When burned in a lamp the wick became black, with formation of scale, after about half an hour's burning, whereas the chimney after about two hours' burning showed a whitish coating. The illuminating power was 14.2 candles.

*Experiment B.*—The crude oil was treated as in Experiment A, but after the neutralization, 700 gr. of active carbon were mixed with the oil for 40 minutes by means of an air jet supplying the air in finely-divided condition. The resulting oil had a greenish water-like color; its smell was less strong than in Experiment A. The lamp wick, after two hours' burning, became dark brown, but without any scale while the lamp chimney showed only a slight whitish coating after five hours' burning. The waste gases had a very slight odor. The illuminating power was 15.2 candles with 14''' Bunsen burners as in Experiment A.

*Experiment C.*—10 liters of Roumanian crude oil of the kind used in Experiments A and B, without subjection to the preliminary treatment with $H_2SO_4$ were thoroughly mixed for 40 minutes by means of an air blast with 300 cubic cms. of 20% NaOH lye, and left to stand for three hours; 500 gr. of finely-divided active carbon were then added and the mixing continued for 40 minutes with a supply of finely-sprayed air. The color of the resulting oil was as clear as crystal, it had a very slight smell similar to ether. The lamp chimney, after ten hours' burning, was still perfectly bright. The wick, after one hour's burning, was still yellowish-white, and only after two hours' burning was it colored brown at the outer edge of the gasifying flame, while the inner portion remained yellow and without coating for another six hours. The waste gases had scarcely any perceptible smell. The illuminating power was 16.5 candles and after ten hours' burning 16.2 candles with the same burner used in Experiments A and B.

*Experiment D.*—10 liters of Roumanian crude lighting oil like that used in Experiments A, B and C, but not subjected to preliminary treatment with $H_2SO_4$ was mixed for 50 minutes with 350 cubic cms. of 25% $Na_2CO_3$ and left to stand for three hours; 700 gr. of active carbon were then added and thoroughly mixed for 40 minutes by a spray of finely-divided air. The resulting oil had an illuminating power after ten hours of 16.8 candles with the same burner used in Experiments A and B. The other properties of the purified oil were almost exactly like that of the purified oil produced in Experiment C.

What I claim is:

1. A process for purifying liquid hydrocarbons comprising treating the hydrocarbons with alkaline lye, mixing the same thereafter with finely divided catalyzers in solid condition and insoluble within the hydrocarbons and then bringing the mixture into thorough contact with oxygen containing gas.

2. A process for purifying liquid hydrocarbons comprising treating the hydrocarbons with alkaline lye, mixing the same thereafter with finely divided active carbon and then bringing the mixture into thorough contact with oxygen containing gas.

3. A process for purifying liquid hydrocarbons comprising treating the hydrocarbons with alkaline lye, mixing the same thereafter with finely divided artificially prepared carbon containing dry distilled naturally occurring fuels and mineral matter and then bringing the mixture into thorough contact with oxygen containing gas.

4. A process for purifying liquid hydrocarbons comprising treating the hydrocarbons with alkaline lye, separating off the alkaline lye by finely divided solid substances, mixing thereafter the hydrocarbons with finely divided catalyzers insoluble within the hydrocarbons and then bringing the mixture into thorough contact with oxygen containing gas.

In testimony whereof I affix my signature in presence of two witnesses.

FELIX RICHTER.

Witnesses:
JEAN GRUND,
CARL GRUND.